(12) United States Patent
Berlinger et al.

(10) Patent No.: US 9,631,995 B2
(45) Date of Patent: Apr. 25, 2017

(54) CERAMIC PRODUCT AND METHOD FOR ITS MANUFACTURE

(75) Inventors: Andrea Berlinger, Baden-Baden (DE);
Ulfert Drewes, Mullheim (DE);
Andreas Roßberg, Bad Säckingen (DE); Detlef Schleiferböck, Hausen (DE); Elke Schmidt, Bad Säckingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 725 days.

(21) Appl. No.: 13/515,342

(22) PCT Filed: Nov. 10, 2010

(86) PCT No.: PCT/EP2010/067158
§ 371 (c)(1),
(2), (4) Date: Jun. 12, 2012

(87) PCT Pub. No.: WO2011/072959
PCT Pub. Date: Jun. 23, 2011

(65) Prior Publication Data
US 2012/0258322 A1    Oct. 11, 2012

(30) Foreign Application Priority Data
Dec. 17, 2009  (DE) .................. 10 2009 054 909

(51) Int. Cl.
*G01L 7/08*  (2006.01)
*G01L 13/02*  (2006.01)
(Continued)

(52) U.S. Cl.
CPC .......... *G01L 9/0075* (2013.01); *C04B 37/006* (2013.01); *C04B 2237/122* (2013.01);
(Continued)

(58) Field of Classification Search
CPC ............ C04B 37/006; C04B 2237/122; C04B 2237/343; C04B 2237/708; C04B 2237/72; C04B 2237/403; G01L 9/0075
See application file for complete search history.

(56) References Cited

U.S. PATENT DOCUMENTS 5,005,421 A  4/1991  Hegner et al.
5,050,034 A  9/1991  Hegner et al.
(Continued)

FOREIGN PATENT DOCUMENTS

DE  102007037169 A1  1/2009
EP      0332978 A1  9/1989
(Continued)

OTHER PUBLICATIONS

International Preliminary Report on Patentability and Written Opinion of the International Searching Authority in corresponding PCT Application No. PCT/EP2010/067158, dated Jul. 12, 2012.
(Continued)

*Primary Examiner* — Harshad R Patel
*Assistant Examiner* — Brandi Hopkins
(74) *Attorney, Agent, or Firm* — Bacon & Thomas, PLLC

(57) ABSTRACT

A ceramic product includes a first ceramic part and a second ceramic part, wherein the first ceramic part is connected with the second ceramic part via a joint, wherein the joint comprises an active hard solder, or braze, characterized in that the joint has an inhomogeneous distribution of the components of the active hard solder, or braze, wherein at least at an interface between the active hard solder, or braze, and the ceramic, the at least one active component of the active hard solder, or braze, is enriched. For manufacture of the product, the active hard solder, or braze, material is provided in such a manner, that at least one surface section of at least one of the ceramic parts is first coated with at least
(Continued)

one active component of the active hard solder, or braze, and that on the coated section, an alloy is provided, which, by melting of the alloy during the heating, alloys with the coating and forms a metal joint between the two ceramic parts.

24 Claims, 1 Drawing Sheet

(51) Int. Cl.
    *G01L 9/00*     (2006.01)
    *C04B 37/00*     (2006.01)

(52) U.S. Cl.
    CPC .. *C04B 2237/343* (2013.01); *C04B 2237/403* (2013.01); *C04B 2237/708* (2013.01); *C04B 2237/72* (2013.01)

(56) References Cited

U.S. PATENT DOCUMENTS

| | | | |
|---|---|---|---|
| 5,334,344 A | | 8/1994 | Hegner |
| 5,351,938 A | * | 10/1994 | Hegner ............... B22D 11/0611 164/429 |
| 5,400,489 A | * | 3/1995 | Hegner et al. ............... 29/25.41 |
| 6,153,021 A | * | 11/2000 | Suzuki et al. ............... 148/252 |
| 2004/0016570 A1 | | 1/2004 | Yamamoto et al. |

FOREIGN PATENT DOCUMENTS

| | | |
|---|---|---|
| EP | 0351701 A2 | 1/1990 |
| EP | 0373536 A2 | 6/1990 |
| EP | 0445382 A2 | 9/1991 |
| EP | 0490807 A2 | 6/1992 |
| EP | 0544934 B1 | 6/1993 |
| EP | 0835716 B1 | 4/1998 |

OTHER PUBLICATIONS

German Search Report in corresponding German Application No. 10 2009054909.9, dated Feb. 26, 2010.
International Search Report in corresponding PCT Application No. PCT/EP2010/067158, dated Dec. 20, 2010.

* cited by examiner

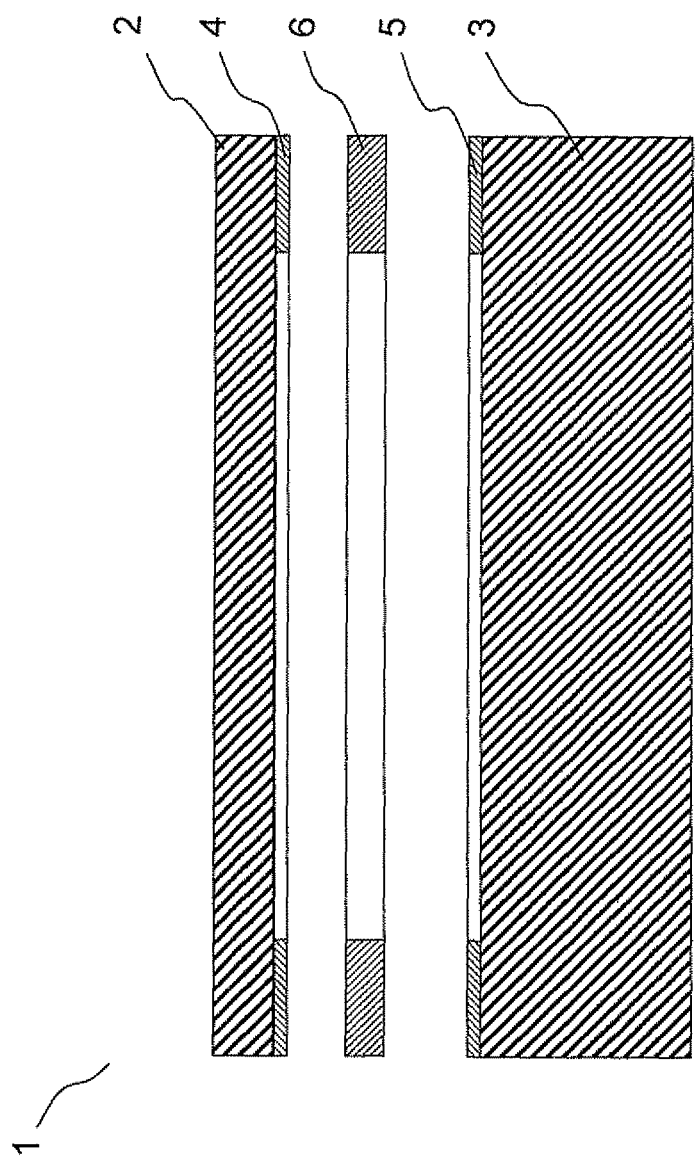

CERAMIC PRODUCT AND METHOD FOR ITS MANUFACTURE

TECHNICAL FIELD

The present invention relates to a ceramic product, especially a ceramic pressure sensor, and a method for its manufacture.

BACKGROUND DISCUSSION

Ceramic pressure sensors comprise a platform and a measuring membrane, wherein the measuring membrane is bonded by means of an active hard solder, or braze. A suitable active hard solder, or braze, for joining ceramic parts made of corundum is, for example, a Zr—Ni—Ti alloy, since its coefficient of thermal expansion is compatible with corundum. In practice, it proves difficult to control the wetting of the ceramic material by the active hard solder, or braze, wherein a balance has to be found between an incomplete wetting and a spreading of the active hard solder, or braze, beyond the intended extent of the joint.

SUMMARY OF THE INVENTION

An object of the present invention is therefore to provide a method and ceramic product manufactured according to this method, which overcome the disadvantages of the state of the art.

The method of the invention comprises: providing a first ceramic part and a second ceramic part; providing an active hard solder, or braze, material between the first ceramic part and the second ceramic part; and heating the active hard solder, or braze, in a soldering/brazing process, wherein, according to the invention, the active hard solder, or braze, material is provided in such a manner, that at least one surface section of at least one of the ceramic parts is first coated with at least one active component of the active hard solder, or braze, and that, on the coated section, an alloy is provided, which, by melting of the alloy during the heating, alloys with the coating and forms a metal joint between the two ceramic parts, wherein at least the active component reacts with the ceramic part.

The soldering/brazing process can be especially a vacuum soldering/brazing process or a soldering/brazing process performed with a protective gas.

In a further development of the invention, each of the two ceramic parts is coated at least in a surface section with at least one active component of the active hard solder, or braze, and the alloy is provided between the coated sections of the first ceramic part and the second ceramic part.

In a further development of the invention, the coating with the at least one active component has a thickness of not less than 10 nm, especially not less than 40 nm, and preferably not less than 80 nm.

In a further development of the invention, the coating with the at least one active component has a thickness of no more than 400 nm, especially no more than 300 nm, and preferably no more than 200 nm.

The at least one active component especially includes titanium or zirconium, wherein the joint comprises a Zr—Ni—Ti alloy. In a further development of the invention, the at least one coating contains Zr and Ti.

According to a further development of the invention, at least one of the ceramic parts comprises corundum.

In a further development of the invention, the ceramic parts comprise a measuring membrane and a platform of a pressure sensor.

The ceramic product of the invention comprises a first ceramic part and a second ceramic part, wherein the first ceramic part is connected via a joint with the second ceramic part, wherein the joint comprises an active hard solder, or braze, wherein the joint has an inhomogeneous distribution of the components of the active hard solder, or braze, wherein at least toward an interface, the a least one active component of the active hard solder, or braze, is enriched.

In a further development of the invention the following pertains:

$$\frac{\int_{-d/2}^{d/2} |x| \cdot c_i(x)\, dx}{\int_{-d/2}^{d/2} c_i(x)\, dx} \geq \frac{a \cdot d}{4},$$

wherein a≥1 especially a≥1.1 and preferably a≥1.3. In such case, d is the thickness of the joint, i.e. the separation of the ceramic parts in the region of the joint, wherein the zero point lies in the middle between the ceramic parts, and wherein $c_i(x)$ is the local concentration of the at least one active component in mass %.

In a further development of the invention the following pertains:

$$\frac{\int_{-d/2}^{d/2} |x| \cdot (c_i(x) - c_i(0))\, dx}{\int_{-d/2}^{d/2} c_i(x) - c_i(0)\, dx} \geq \frac{a \cdot d}{4},$$

wherein a≥1.1 especially a≥1.25, preferably a≥1.5 and further preferably a≥1.7. In a further development of the invention, the joint comprises a ternary Zr—Ni—Ti alloy with $c_{Zr}$ mass % Zr, $c_{Ni}$ mass % Ni and $c_{Ti}$ mass % Ti, wherein especially 100>$c_{Zr}$+$c_{Ni}$+$c_{Ti}$≥100−R, with R<0.5, preferably R<0.3 and further preferably R<0.25, wherein the $c_i$ is the average concentration of the component i across the joint.

The impurities can comprise, for example, oxygen, carbon and other metals, wherein the fraction of other metals on a mass basis amounts, for example, to no more than 400 ppm, preferably no more than 300 ppm, and especially preferably to no more than 250 ppm. The oxygen portion amounts, for example, to no more than 3000 ppm, preferably no more than 2500 ppm and further preferably to no more than 2200 ppm. Oxygen can be present especially in the form of oxides of the alloy components. Carbon can be present, for example, in a concentration of no more than 300 ppm, preferably no more than 200 ppm and especially preferably no more than 150 ppm. In the case of determining the concentration of metal impurities, aluminum atoms, which diffuse from the matrix of the ceramic parts into the alloy of the joint are not considered contamination. Likewise, the active alloy components diffused into the matrix of the ceramic parts and oxidized there are not indicators of oxygen impurities. Consequently, in the case of determining the concentration of impurities, only a central volume range of the joint, for example, can be considered, which extends, for example, from −0.4 d to 0.4 d, preferably from −0.35 d to 0.35 d,.

The concentrations of the components of the alloy lie in the ranges, for example, $55<c_{Zr}<65.5$, $20.5<c_{Ni}<27.5$ and $14<c_{Ti}<17.5$. In a currently preferred embodiment, these ranges are $61<c_{Zr}<63.5$, $21.5<c_{Ni}<24$ and $14.5<c_{Ti}<15.5$. Especially preferred target values for the concentrations are $c_{Zr}=63$, $c_{Ni}=22$ and $c_{Ti}=15$, wherein for those skilled in the art, it is understood that these exact values can, in practice, only be achieved within certain tolerances.

Due to the preparation of the joint via a coating of a ceramic part with an active component, it is to be assumed that the non-active component is present on the interface with the ceramic part in a smaller concentration relative to the volume of the joint. In this respect, for example, a boundary region of the active hard solder, or braze, is present, in which the concentration of aluminum atoms diffused in from the ceramic is greater than the concentration of Ni-atoms in this region. This region extends, for example, not less than 10 nm, especially not less than 40 nm, and preferably not less than 80 nm from the interface between the ceramic part and the joint in the direction of the joint. The interface is for these considerations defined as the area with the x-coordinate, which separates the region with $c_{Zr}(x)+c_{Ni}(x)+c_{Ti}(x) \geq c_{Al}(x)+c_o(x)$ from the region with $c_{Zr}(x)+c_{Ni}(x)+c_{Ti}(x) \leq c_{Al}(x)+c_o(x)$.

In a further development of the invention, the joint has a thickness of not less than 0.5 μm and no more than 150 μm, especially no more than 80 μm, and preferably no more than 50 μm.

The ascertaining of the concentrations $c_i(x)$ can occur, for example, with a TOF-SIMS method, thus with secondary ion mass spectroscopy according to the travel time method.

In a further development of the invention, the ceramic product is a pressure sensor, wherein the ceramic parts comprise a platform and a measuring membrane.

The pressure sensor of the invention furthermore includes a transducer (not illustrated in greater detail here) for transducing a pressure dependent deformation of the measuring membrane into an electrical or optical signal. The transducer can especially be a capacitive, a resistive or an interferometric transducer.

The pressure sensor can especially comprise an absolute pressure sensor, a relative pressure sensor or a pressure difference sensor. In the case of a pressure difference sensor, a measuring membrane can, for example, be arranged between two substrates, or a platform bears two measuring membranes, which are hydraulically coupled with one another via a pressure transfer liquid in the platform. The joint between the one measuring membrane and the two substrates, or between the two measuring membranes and the one platform can, according to the invention, be prepared in such a manner, that, first of all, a coating of the platform and/or the measuring membrane in the region of the joints occurs in each case with an active component of the active hard solder, or braze, before an active solder preform is introduced for performing the soldering/brazing process between the coated ceramic parts.

BRIEF DESCRIPTION OF THE DRAWINGS

The invention will now be explained in greater detail on the basis of the appended drawing, the sole figure of which shows as follows:

FIG. 1 illustrates components of a pressure sensor of the invention.

DETAILED DISCUSSION IN CONJUCTION WITH THE DRAWINGS

The components of a ceramic pressure sensor 1 illustrated in FIG. 1 comprise a circular, disk shaped measuring membrane 2 and a circular, disk shaped platform 3 made of corundum. The measuring membrane 2 and the platform 3 have, for example, a diameter of 20 mm. The measuring membrane 2 and the platform 3 are to be pressure-tightly connected by means of a Zr—Ni—Ti active hard solder, or braze, in a high vacuum soldering/brazing process.

In contrast to the previous standard method, however, an annular coating 4, 5 of an active component is deposited, respectively, on the measuring membrane 2 and on the platform 3 in the region of the joint. This can be, for example, a titanium layer in each case with a thickness of, for example, 150 nm. The coatings 4, 5 can be deposited, for example, in a sputtering process.

Between the two coatings is then arranged an annular active hard solder, or braze, preform 6, which aligns with the coatings, and which has, for example, a thickness of 20 μm. In the alloy of active hard solder, or braze, preform 6, the concentration of titanium can be reduced, for example, to about 10%, in order to approach the ideal alloy with $c_{Zr}=63$, $c_{Ni}=22$ and $c_{Ti}=15$ in the average across the joint after the soldering/brazing process. An example of the composition of the active hard solder, or braze, preform would be: $C_{Zr}=64$, $c_{Ni}=22.5$ and $c_{Ti}=13.5$.

After the active hard solder, or braze, preform is arranged between the coatings, the components are connected with one another in a soldering/brazing process, especially a high vacuum soldering/brazing process.

Instead of a coating with titanium, a coating with zirconium or with a mixture of titanium and zirconium can also be used.

Via the coatings with the active component, an improved control of the interaction between the active component and the corundum is obtained.

The invention claimed is:

1. A ceramic product, comprising:
   at least a first ceramic part and a second ceramic part, wherein:
   said first ceramic part is connected with said second ceramic part via a joint;
   said joint having a thickness;
   said joint comprises an active hard solder, or braze, said active hard solder, or braze, comprising at least one active component, said active component having a location-dependent concentration
   said joint has an inhomogeneous distribution of the components of the active hard solder, or braze, and at least at an interface between the active hard solder, or braze, and the ceramic, said active component of the active hard solder, or braze, is enriched, wherein:

$$\frac{\int_{-d/2}^{d/2} |x| \cdot c_i(x) dx}{\int_{-d/2}^{d/2} c_i(x) dx} \geq \frac{a \cdot d}{4},$$

wherein a>1.0, wherein d is said thickness of said joint, wherein x is an integration variable, said integration variable having a zero point, wherein said zero point of said integration variable, x, lies in the middle of the joint between the ceramic parts, and wherein $c_i(x)$ is the location-dependent concentration of said at least one active component in mass %.

2. The ceramic product as claimed in claim 1, wherein: a>1.1.

3. The ceramic product as claimed in claim 1, wherein: a>1.3.

4. The ceramic product as claimed in claim 1, wherein:
the ceramic product is a pressure sensor; and
the ceramic parts comprise a platform and a measuring membrane.

5. The ceramic product as claimed in claim 1, wherein:
the joint comprises a ternary Zr—Ni—Ti alloy with $c_{Zr}$ mass % Zr, $c_{Ni}$ mass % Ni and $c_{Ti}$ mass % Ti, wherein $100 > c_{Zr} + c_{Ni} + c_{Ti} \geq 100 - R$, with $R < 0.5$.

6. The ceramic product as claimed in claim 5, wherein: $R < 0.3$.

7. The ceramic product as claimed in claim 5, wherein: $R < 0.25$.

8. The ceramic product as claimed in claim 5, wherein:
concentrations of components of the alloy lie in the ranges, $55 < c_{Zr} < 65.5$, $20.5 < c_{Ni} < 27.5$ and $14 < c_{Ti} < 17.5$.

9. The ceramic product as claimed in claim 5, wherein:
concentrations of components of the alloy lie in the ranges, $61 < c_{Zr} < 63.5$, $21.5 < c_{Ni} < 24$ and $14.5 < c_{Ti} < 15.5$.

10. The ceramic product as claimed in claim 1, wherein:
said first ceramic part and/or said second ceramic part comprise aluminum oxide, said aluminum oxide comprising aluminum atoms;
a boundary region is present, in which a concentration of aluminum atoms in the active hard solder, or braze, diffused in from said first or second ceramic part is larger than the concentration of Ni-atoms in this region, wherein said region extends not less than 10 nm from the interface between the ceramic part and the active hard solder, or braze, in the direction of the active hard solder, or braze.

11. The ceramic product as claimed in claim 10, wherein:
said boundary region extends not less than 40 nm from the interface between the ceramic part and the active hard solder, or braze, in the direction of the active hard solder, or braze.

12. The ceramic product as claimed in claim 10, wherein:
said boundary region extends not less than 80 nm from the interface between the ceramic part and the active hard solder, or braze, in the direction of the active hard solder, or braze.

13. A ceramic product, comprising:
at least a first ceramic part and a second ceramic part, wherein:
said first ceramic part is connected with said second ceramic part via a joint;
said joint having a thickness;
said joint comprises an active hard solder, or braze, said active hard solder, or braze, comprising at least one active component;
said at least one active component having a location-dependent concentration;
said joint has an inhomogeneous distribution of the components of the active hard solder, or braze, and at least at an interface between the active hard solder, or braze, and the ceramic, said active component of the active hard solder, or braze, is enriched, wherein:

$$\frac{\int_{-d/2}^{d/2} |x| \cdot (c_i(x) - c_i(0)) dx}{\int_{-d/2}^{d/2} c_i(x) - c_i(0) dx} \geq \frac{a \cdot d}{4},$$

wherein $a \geq 1.25$, wherein d is the thickness of the joint, wherein x is an integration variable, said integration variable having a zero point,
wherein said zero point of said integration variable, x, lies in the middle of the joint between the ceramic parts, and wherein $c_i(x)$ is the location-dependent concentration of the at least one active component in mass %.

14. The ceramic product as claimed in claim 13, wherein: $a > 1.5$.

15. The ceramic product as claimed in claim 13, wherein: $a > 1.7$.

16. The ceramic product as claimed in claim 13, wherein:
the ceramic product is a pressure sensor, wherein the ceramic parts comprise a platform and a measuring membrane.

17. The ceramic product as claimed in claim 13, wherein:
the joint comprises a ternary Zr—Ni—Ti alloy with $c_{Zr}$ mass % Zr, $c_{Ni}$ mass % Ni and $c_{Ti}$ mass % Ti, wherein $100 > c_{Zr} + c_{Ni} + c_{Ti} \geq 100 - R$, with $R < 0.5$.

18. The ceramic product as claimed in claim 17, wherein: $R < 0.3$.

19. The ceramic product as claimed in claim 17, wherein: $R < 0.25$.

20. The ceramic product as claimed in claim 17, wherein:
concentrations of components of the alloy lie in the ranges, $55 < c_{Zr} < 65.5$, $20.5 < c_{Ni} < 27.5$ and $14 < c_{Ti} < 17.5$.

21. The ceramic product as claimed in claim 17, wherein:
concentrations of components of the alloy lie in the ranges, $61 < c_{Zr} < 63.5$, $21.5 < c_{Ni} < 24$ and $14.5 < c_{Ti} < 15.5$.

22. The ceramic product as claimed in claim 13, wherein:
said first ceramic part and/or said second ceramic part comprise aluminum oxide, said aluminum oxide comprising aluminum atoms;
a boundary region is present, in which a concentration of aluminum atoms in the active hard solder, or braze, diffused in from said first or second ceramic part is larger than the concentration of Ni-atoms in this region, wherein said region extends not less than 10 nm from the interface between the ceramic part and the active hard solder, or braze, in the direction of the active hard solder, or braze.

23. The ceramic product as claimed in claim 22, wherein:
said region extends not less than 40 nm from the interface between the ceramic part and the active hard solder, or braze, in the direction of the active hard solder, or braze.

24. The ceramic product as claimed in claim 22, wherein:
said region extends not less than 80 nm from the interface between the ceramic part and the active hard solder, or braze, in the direction of the active hard solder, or braze.

* * * * *